United States Patent
Hulvey

(10) Patent No.: US 8,147,332 B2
(45) Date of Patent: Apr. 3, 2012

(54) METHOD OF INDICATING THE ORDINAL NUMBER OF A PLAYER IN A WIRELESS GAMING SYSTEM

(75) Inventor: Robert W. Hulvey, Redondo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 589 days.

(21) Appl. No.: 11/431,204

(22) Filed: May 10, 2006

(65) Prior Publication Data
US 2007/0093291 A1 Apr. 26, 2007

Related U.S. Application Data

(60) Provisional application No. 60/729,152, filed on Oct. 21, 2005.

(51) Int. Cl.
*A63F 9/24* (2006.01)
(52) U.S. Cl. ............... 463/37; 463/31; 463/36; 463/38; 463/42; 463/46
(58) Field of Classification Search .................. 273/148; 463/31, 36–38, 42, 46
See application file for complete search history.

(56) References Cited

U.S. PATENT DOCUMENTS 6,957,086 B2 * 10/2005 Bahl et al. ..................... 455/557
7,235,012 B2 * 6/2007 DiDato ........................... 463/38

OTHER PUBLICATIONS

Game Informer, The Road to E3 2005: The Xbox 360 Officially Unveiled!, May 12, 2005, http://www.gameinformer.com/News/Story/200505/N05.0512.1953.02122.htm.*

* cited by examiner

*Primary Examiner* — Omkar Deodhar
(74) *Attorney, Agent, or Firm* — Garlick & Markison

(57) ABSTRACT

In a wireless gaming system, one or more game controllers may be visually associated with corresponding player identities by using colored indicator lights on the game controller(s) and game console to identify which player in a computer game is controlled by a given controller. Indicator lights on the controller are illuminated in response to control signals sent via Bluetooth wireless signals so as to match the indicator lights on the console. When multiple controllers are used with a multi-player computer game, a single wireless interface device at the game console is used to issue control signals to each controller so that each controller has a light indicator that is illuminated to identify which player is controlled by the controller.

16 Claims, 5 Drawing Sheets

METHOD OF INDICATING THE ORDINAL NUMBER OF A PLAYER IN A WIRELESS GAMING SYSTEM

CROSS-REFERENCE TO RELATED APPLICATION

This application claims the benefit under 35 U.S.C. §119(e) of U.S. Provisional Application No. 60/729,152, filed Oct. 21, 2005, entitled "Method of Indicating the Ordinal Number of a Player in a Wireless Gaming System," which is incorporated herein by reference in its entirety.

BACKGROUND OF THE INVENTION

1. Field of the Invention

The present invention is directed in general to computer game systems. In one aspect, the present invention relates to a method and system for coupling an input/output device, such as a controller, with a video game executing on a system or platform, such as a console or PC computer.

2. Related Art

In recent years, computing systems or platforms have been used to execute computer games, such as console video game systems. Examples of such console video game systems (such as Sony Playstation 2, Nintendo GameCube, Microsoft Xbox, etc.) include a game console that is hardwire-connected to a television set or other visual display, and that is wired or wirelessly connected to one or more controllers. A technical obstacle presented by having multiple controllers configured in a multi-player game is the requirement of associating each player in the game with the corresponding controller.

With hardwired controllers, a controller for each player is typically connected to a numbered connector on the game console. Each player is typically designated by a number, e.g. Player #1 is the player using the controller plugged into connector #1, Player #2 is the player using the controller plugged into connector #2, and so on. The player number associates the "real" player with a virtual player or object seen on the video screen. While the use of hardwired controller connections alleviates the player/controller association problem, it does so by imposing substantial disadvantages insofar as the wires can become tangled, the wire length can limit the distance of the player from the console and the wired controllers have reduced portability.

Many of these disadvantages are reduced with a wireless controller which wirelessly communicates with a receiver plugged into a port on the game console by using a specific channel as selected on a dial or switch on the controller and receiver. However, such wireless controllers are typically sold as after-market accessory products which use the same method as wired controllers for identifying players, namely, wirelessly plugging a wireless game controller into a corresponding or dedicated wireless connector which is wire-connected to the console. Alternatively, the wireless controllers are physically preconfigured to identify the player/controller associations, such as by forming each controller housing with a different colored material, thereby limiting controller interchangeability and increasing controller manufacturing costs. Other wireless controllers establish player/controller associations by using proprietary wireless communication protocols to control communication between the console and the controller(s), though this approach imposes complexity costs on the system design and reduces the ability to flexibly use a controller with non-proprietary game systems. In addition, some wireless controllers, such as disclosed in U.S. Pat. No. 6,511,378, include an embedded liquid crystal display (LCD) to display a player number for the controller, which again addresses the player/controller association problem, but at the expense of imposing complexity costs on the system design by requiring LCD display and control circuits for each controller.

Accordingly, an improved method and system is needed for flexibly, inexpensively and efficiently associating one or more wireless game controllers with the corresponding player identities in a computer game. Further limitations and disadvantages of conventional systems will become apparent to one of skill in the art after reviewing the remainder of the present application with reference to the drawings and detailed description which follow.

SUMMARY OF THE INVENTION

In one aspect of the present invention, a method and system are disclosed for indicating the ordinal number of a player in a wireless gaming system by using indicator lights to identify a particular player in a computer-based game that is associated with a particular wireless game controller. In a multi-player game embodiment where there are two or more wireless game controllers coupled to a computing platform (such as a personal computer (PC), game console or other computing platform or system), a game controller assigned to a particular player is identified using matching colored indicators on the computer platform and the controller so that the color of the indicator on the controller matches the color of the player on the platform. For example, each controller may have a single multi-colored light where the color of the light is selected to correspond to the player color indicated on the computer platform, which may be indicated with one or more color indicators on a game console or with a color indicator on the game display screen. Each controller may also have a plurality of different-colored light indicators, where the selection of the color on the controller to be illuminated depends on the player number associated with the controller and identified at the computer platform with a corresponding color indication. Where a game console uses colored or numbered indicator lights to identify different players, each controller may have numbered indicator lights, one of which would light to indicate the player color. In this way, each player in a game may be associated with a different game controller using a color identification scheme so that numbers and wire connectors no longer need to be explicitly used.

In accordance with various embodiments of the present invention, a method and apparatus provide an improved technique for providing players of video and other games using wireless controllers a means to identify which controller is associated with a virtual "player" as seen on the video screen or other display. The wireless controllers may use any desired wireless communication protocol to communicate with a computer system. In various embodiments, the wireless controllers may be implemented as game controller devices having a portable housing; one or more input keys or analog joysticks for generating one or more control signals for controlling player actions in a video game executing on the computer system; a transceiver antenna for wirelessly exchanging control signals with the computer system; and one or more light indicators for indicating an ordinal number of a video game player in the video game that is associated with and controlled by the wireless game controller device. In various embodiments, the light indicators may be implemented as a single multi-colored light, as a multi-colored LED light pipe, as colored indicator lights, as different-colored light emitting diodes, or as numbered indicator lights identifying which player is controlled by the game controller device.

The objects, advantages and other novel features of the present invention will be apparent to those skilled in the art from the following detailed description when read in conjunction with the appended claims and accompanying drawings.

DETAILED DESCRIPTION

A method and apparatus are described for associating one or more input/output devices (e.g., game controller devices) with a video game executing on a system or platform (e.g., a computer system or game console), such as by using light indicators to indicate the ordinal number of a player in a wireless gaming system. While various details are set forth in the following description, it will be appreciated that the present invention may be practiced without these specific details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the art to describe and convey the substance of their work to others skilled in the art. Unless specifically stated otherwise as apparent from the following discussion, it is appreciated that throughout the description, discussions using terms such as processing, computing, calculating, determining, displaying or the like, refer to the action and processes of a computer system, or similar electronic computing device or circuit, that manipulates and/ or transforms data represented as physical, electronic and/or magnetic quantities within the computer system's registers and memories into other data similarly represented as physical quantities within the computer system memories or registers or other such information storage, transmission or display devices.

Figure 1:
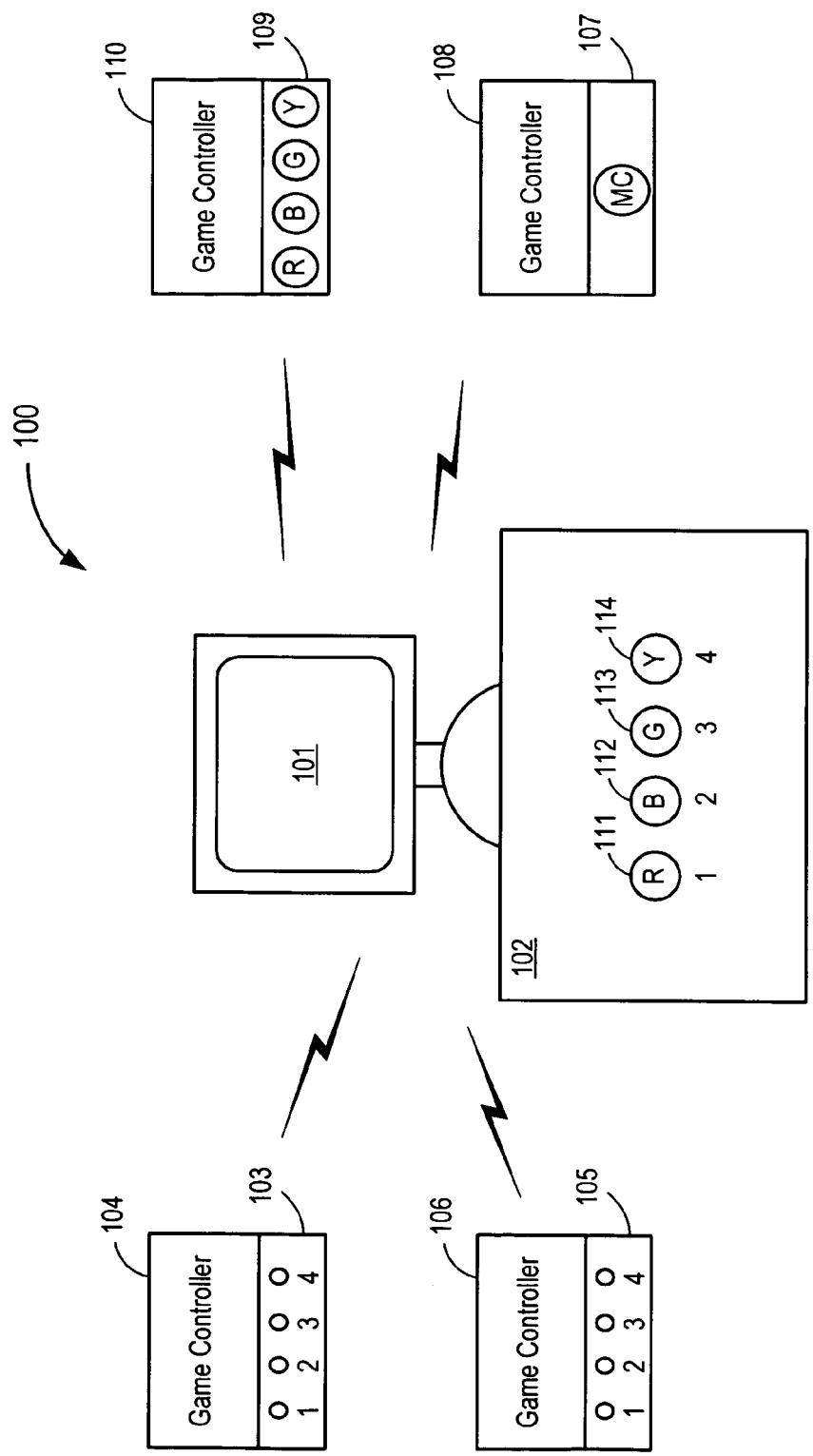
FIG. 1 illustrates an example computer game system with a PC host or console and a plurality of wirelessly enabled game controllers which are configured to provide a visual association of each controller with a corresponding player.

A selected embodiment of the present invention is shown in FIG. 1, which depicts an example computer game system 100 with a PC host or console 102, a display 101, and a plurality of wirelessly enabled game controllers 104, 106, 108, 110, each of which includes a wireless interface device for exchanging wireless signals. The PC host or console 102 and each wirelessly enabled game controller 104, 106, 108, 110 support user input and/or output operations when a computer-based game or other application is executing on the PC host/ console 102, which may also be referred to as a wirelessly enabled host, a serviced host, a host computer, a computer host, etc. As will be described further with reference to FIG. 4, the PC host/console 102 may include a host-side wireless interface that supports a wireless networking standard, such as the Bluetooth standard, any other wireless standards (e.g., 802.11, 802.15, 802.16, 802.20, Zigbee, etc.), or any proprietary wireless protocols. Likewise, each game controller 104, 106, 108, 110 may include a wireless interface that supports a wireless protocol for exchanging control signals so that the system 100 provides a visual association between a game controller (e.g., 104) with a corresponding player in the game executing on the PC host/console 102.

In a representative embodiment, the visual association of game players and controllers is controlled by the game application or related driver executing on the PC host/console 102 which assigns a player identification code or identifier to each game player. The wirelessly enabled host then determines which game controllers 104-110 are wirelessly linked or coupled to the host/console 102, such as by using the Bluetooth wireless protocol to poll or detect each controller device. The wirelessly enabled host 102 can then link or associate each player identification code with a detected game controller device (or vice versa), and then issue indicator control signals which control the actuation or illumination of light indicators 111-114 on the PC host/console 102 and the light indicators (e.g., colored light indicator 109) on the controller(s) (e.g., controller 110) so that the color of the light indicator 109 on the controller 110 matches the color of the player on the PC host/console 102 which is associated with controller 110. In accordance with various embodiments of the present invention, visual association may be accomplished in a variety of different ways.

One way is to have one colored LED per player on the PC host/console 102 (e.g., red LED 111 for "Player 1," blue LED 112 for "Player 2," etc.) and to have a controller (e.g., controller 110) include colored LEDs 109 for each player number. With this arrangement, if the game application executing on the wirelessly enabled host 102 determines that "Player 2" is to be associated with game controller 110, the application issues indicator control signals to actuate the blue colored indicator light 112 on the PC host/console 102, and also wirelessly transmits indicator control signals to actuate the blue colored indicator light (B) 109 on the controller 110, thereby providing a visual association or match of the controller 110 and "Player 2."

Alternatively, one or more of the controllers (e.g., 108) may have a single multi-colored (MC) indicator light 107, such as a multi-color LED or multiple LEDs with outputs fed to a combining light-pipe such that the player sees a single colored indicator. Thus, if the game application executing on the wirelessly enabled host 102 determines that "Player 4" is to be associated with game controller 108, the application issues indicator control signals to actuate the yellow colored indicator light 114 on the PC host/console 102, and also wirelessly transmits indicator control signals to cause the multi-colored indicator light 107 on the controller 108 to turn yellow, thereby providing a visual association or match of the controller 108 and "Player 4." The color of the indicator 107 immediately tells the user which player number has been assigned to controller 108, and does so with an efficient and low-cost circuit that allows the controller to be flexibly used.

Yet another alternative is to include numbered indicator lights (e.g., 103) on each controller (e.g., 104), one of which would light to indicate the player number controlled by that controller. With this arrangement, if "Player 1" is to be associated with game controller 104, indicator control signals are wirelessly transmitted to cause the first indicator light (1) 103 on the controller 104 to turn on, thereby providing a visual association or match of the controller 104 and "Player 1."

As will be appreciated, additional visual association techniques may be used to match or associate a controller with a player. For example, instead of using colored LEDs 111-114 on the PC host/console 102 to identify each player, the visual portion of the computer-based game depicted on the display screen 101 may be used to identify a particular color (e.g., green) with a particular player (e.g., "Player 3"). In connection with the player/color associations being displayed on the screen, the game application selects a controller for association with the player and wirelessly transmits an indicator control signal to the selected controller to cause the indicator light on the controller to provide a visual association (e.g., turn on a green LED or light up the numbered light), thereby providing a visual association or match of the selected controller and player.

Figure 2:
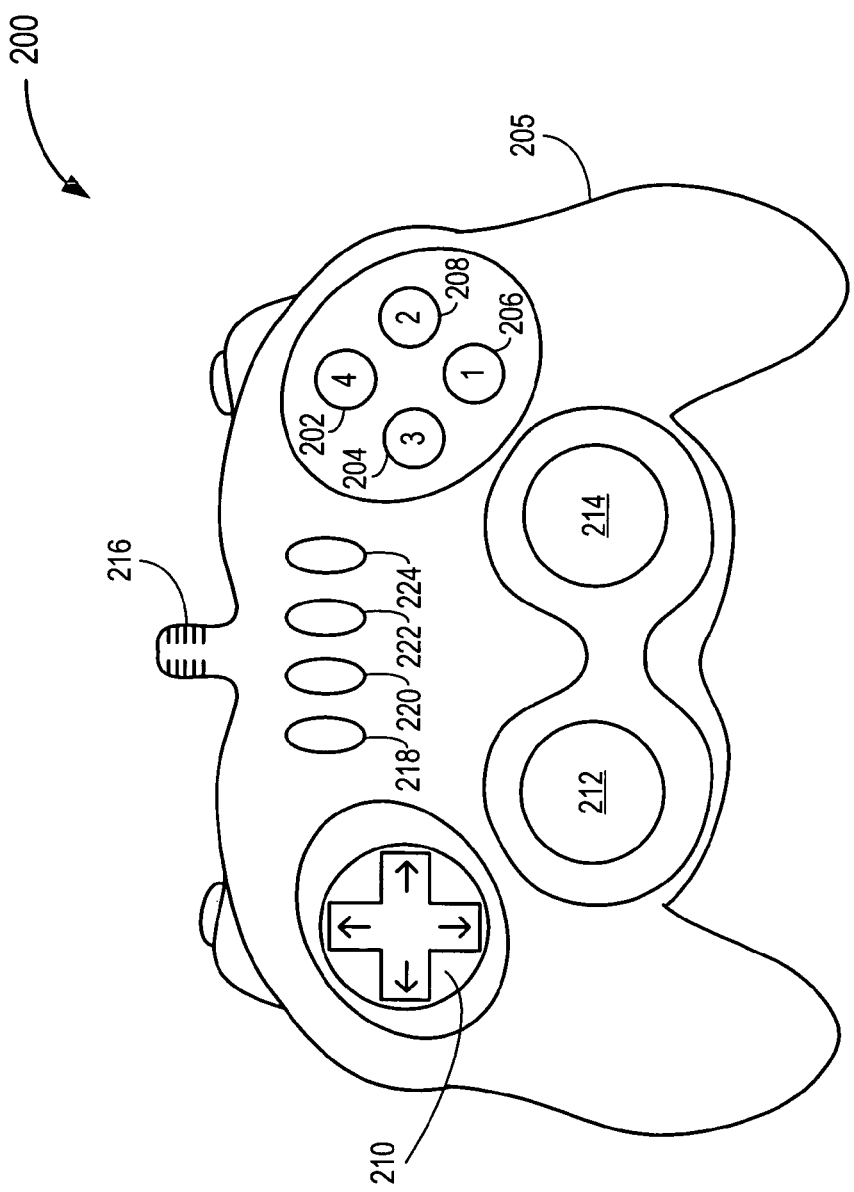
FIG. 2 is a simplified drawing of an exemplary game controller that includes one or more colored indicator lights for associating the game controller with a player identity in a computer-based game.

FIG. 2 is a simplified drawing of an exemplary game controller or game pad device 200 that includes a portable housing 205, input keys 202, 204, 206, 208, and 210, and analog joystick inputs 212 and 214 for generating signals for controlling the movements and/or actions of a player in a game, and a transceiver antenna 216 for wirelessly sending and receiving control signals. As will be appreciated, the input means may also be responsive to pressure, audible sounds, light, movement, and other stimuli. The depicted game controller or game pad device 200 also includes one or more colored indicator lights 218, 220, 222, 224 for associating the game controller with a player identity in a computer-based game. It will be appreciated that the present invention is not restricted in scope to the specific physical configuration or structure of the embodiment depicted in FIG. 2, and may be applied to any input/output device, game pad or game device. When one or more game controller or game pad devices 200 are wirelessly coupled to the PC host/console (or to a base station which is physically and electrically connected to the host computing system), each device is identified with a unique number which is used to associate the device 200 with a particular player. Once an association is established by the PC host/console, the player number association may be visually indicated with light indicators (e.g., light indicator 218) on the device 200. With such a simplified visual indication, it is possible to avoid the cost and complexity associated with including display and control circuitry for displaying a player number on a game pad LCD.

As described herein, one or more light indicators may be used to visually associate the game controller or game pad device 200 with a player that is visually indicated at the PC host/console. For example, by providing the device 200 with a plurality of numbered indicator lights 218, 220, 222, 224, the host computing system may transmit a control signal to the device 200 associated with a particular player (e.g., Player 2). The received control signal is processed by the device 200 to cause the corresponding numbered indicator light (e.g., light 224) to illuminate, thereby indicating the player number associated with that controller.

Instead of or in addition to having numbered indicator lights, the device 200 may include a plurality of colored lights 218, 220, 222, 224 (e.g., LED lights), where each colored light corresponds to a player in the computer game. With this configuration, when the host computing system associates a device 200 with a particular player (e.g., Player 1) that is visually indicated at the PC host/console (or associated display) with a particular color, a control signal is transmitted to the device 200, where it is processed to cause the corresponding colored light (e.g., light 222) to illuminate. For example, if Player 1 is visually indicated as a "green" player at the PC host/console, the green light 222 on the device turns on to indicate that the device is associated with Player 1.

In yet another embodiment, the device 200 has a single multi-colored light or multiple lights with outputs fed to a combining light-pipe so that only a single color is emitted. With such a configuration, the light indicators 218-224 would be replaced with a single light indicator which, in response to control signals from the PC host/console, would illuminate with the color corresponding to the player number associated with the device 200, thereby notifying the user which player number is assigned to and/or controlled by device 200.

Whichever indicator light approach is used at the input/output device, game pad or game device 200, the PC host/console (or to a base station which is physically and electrically connected to the host computing system) may also include one or more light indicators for identifying which player is associated with which color or number. Thus, one or more colored indicator lights (e.g., lights 111-114 in FIG. 1) on the console may be used to identify which color corresponds to which player.

Figure 3:
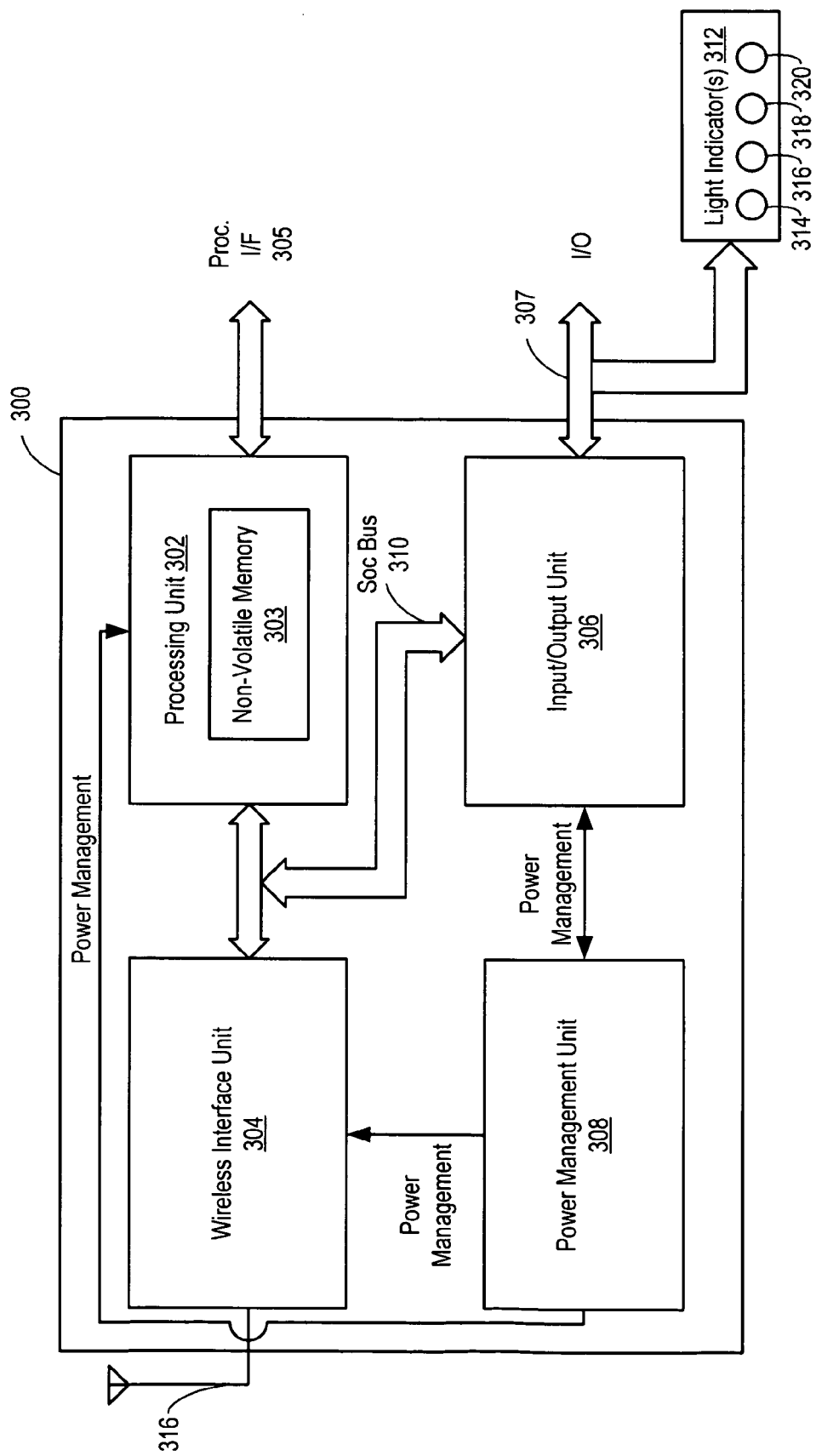
FIG. 3 is a block diagram illustrating a wireless interface device included in a wireless input/output device, such as a wirelessly enabled game controller.

To provide wireless transmission and reception of input/output and control signals, a wireless interface device may be included in the wireless input/output device, such as a game pad or game device. The wireless interface device 300 may be implemented as a single-chip Bluetooth device, such as Broadcom's BCM2042 or BCM2045. FIG. 3 is a block diagram illustrating an integrated circuit wireless interface device 300 included in the wireless input/output device, such as a wirelessly enabled game controller. As depicted, the wireless interface device 300 includes a processing unit 302 (with its own non-volatile memory 303), a wireless interface unit 304, an input/output unit 306, and a power management unit 308. The wireless interface unit 304 couples the wireless interface device 300 to antenna 316, and may include a Bluetooth baseband core, frequency synthesizer, 2.4 GHz radio transceiver module and a transmit/receive switch circuit. While a variety of communication protocols may be used, the wireless interface unit 304 may advantageously operate according to the Bluetooth specification and in particular to the Bluetooth Human Interface Device (HID) Profile specification.

Processing unit 302, wireless interface unit 304, and input/output unit 306 couple with one another via a system on chip (SOC) bus 310. Processing unit 302 includes a processor interface 305 that may be used to couple the processing unit 302 to one or more external devices such as memories or peripherals. Input/output unit 306 includes an input/output set of signal lines or interface 307 that couple the wireless interface device 300 to at least one user input device (e.g., the input keypads of a game controller or game pad device) and/or to one or more output devices, such as light indicator unit 312 which includes one or more light indicators 314, 316, 318, 320 which may be separately activated in response to predetermined control signals received from the host computing system, as described herein.

Figure 4:
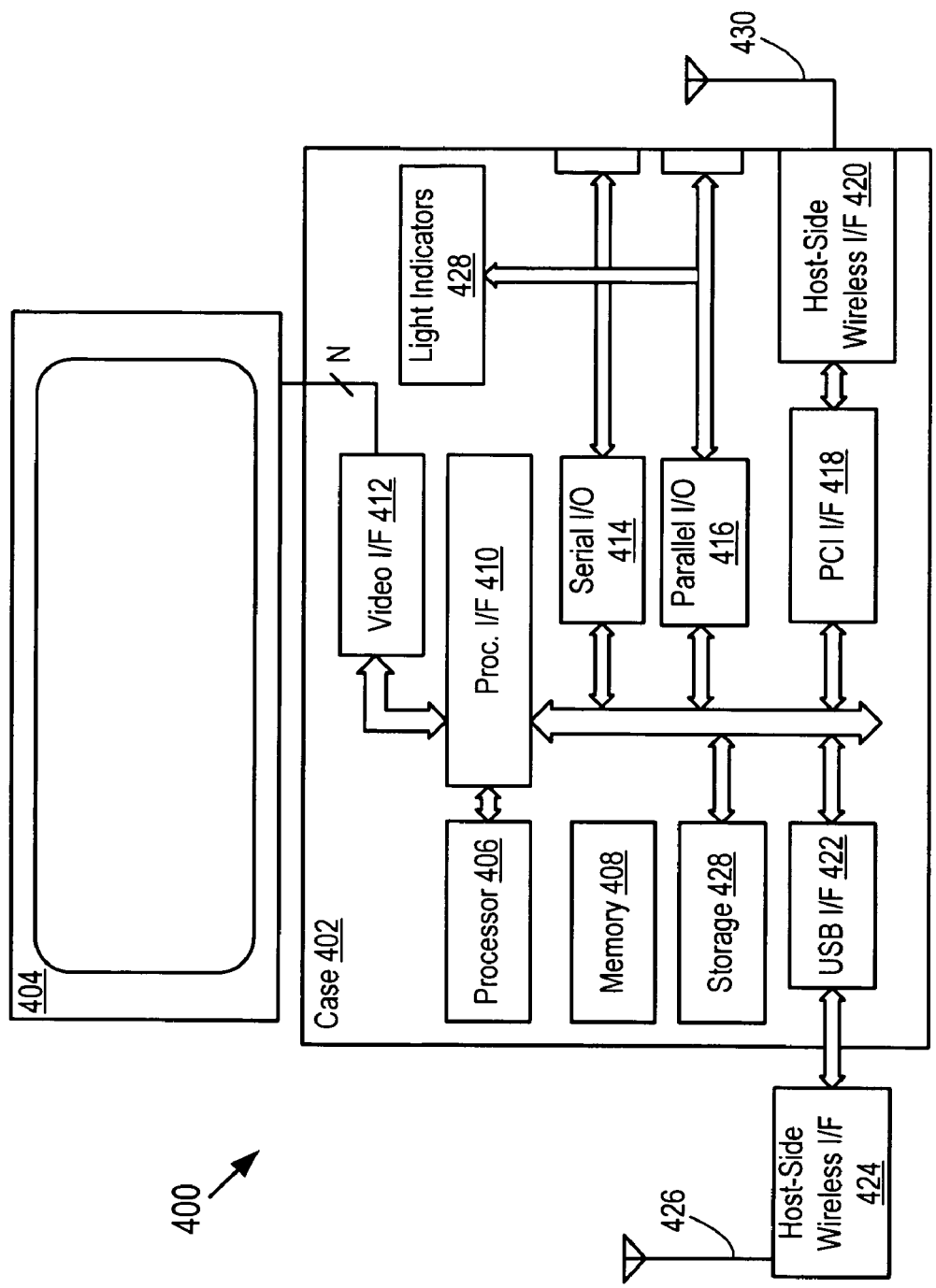
FIG. 4 is a block diagram illustrating a host computer containing a host-side wireless interface.

On the host computing system, wireless transmission and reception of input/output and control signals are also provided by including a wireless interface device in the PC host/console. FIG. 4 is a block diagram illustrating an integrated circuit wireless interface device included in or coupled to the host computer system (e.g., PC host/console) that services a wireless user input/output device, such as a wirelessly enabled game controller, to provide a visual indication of the player/controller association using a light indicator circuit 428. The host computer system 400 includes a case 402, a monitor or display 404, and a light indicator circuit 428 with one or more indicator lights or LEDs, where each light or LED identifies a particular player number. Alternatively, the monitor or display 404 may be used to identify a particular color with a particular player number. The case 402 includes a mother board upon which are mounted a processor 406, memory 408, a processor interface 410, and a video interface 412. The processor interface 410 interfaces the processor 406 to serial I/O 414, parallel I/O 416, a PCI interface 418, a Universal Serial Bus (USB) interface 422, and to memory storage 428 (e.g., disk storage, CD-ROM storage, or other storage devices).

In an exemplary embodiment, the host computer system 400 communicates with the light indicator circuit 428 using the serial I/O 414 or a general purpose input/output interface, such as a parallel I/O 416, though other communication links or interfaces may be used. In addition, the host computer system 400 includes at least one host-side wireless interface 420 or 424 that services one or more wireless user input/output devices, e.g., a wireless game controller or game pad device. As shown, host-side wireless interface 424 couples to the USB interface 422 and includes a coupled antenna 426. In addition or in the alternative, the host-side wireless interface 420 couples to the PCI interface 418 and includes a coupled antenna 430. Either or both of the host-side wireless interfaces 420 and 424 services one or more wireless user input/output devices and may employ different protocols.

Figure 5:
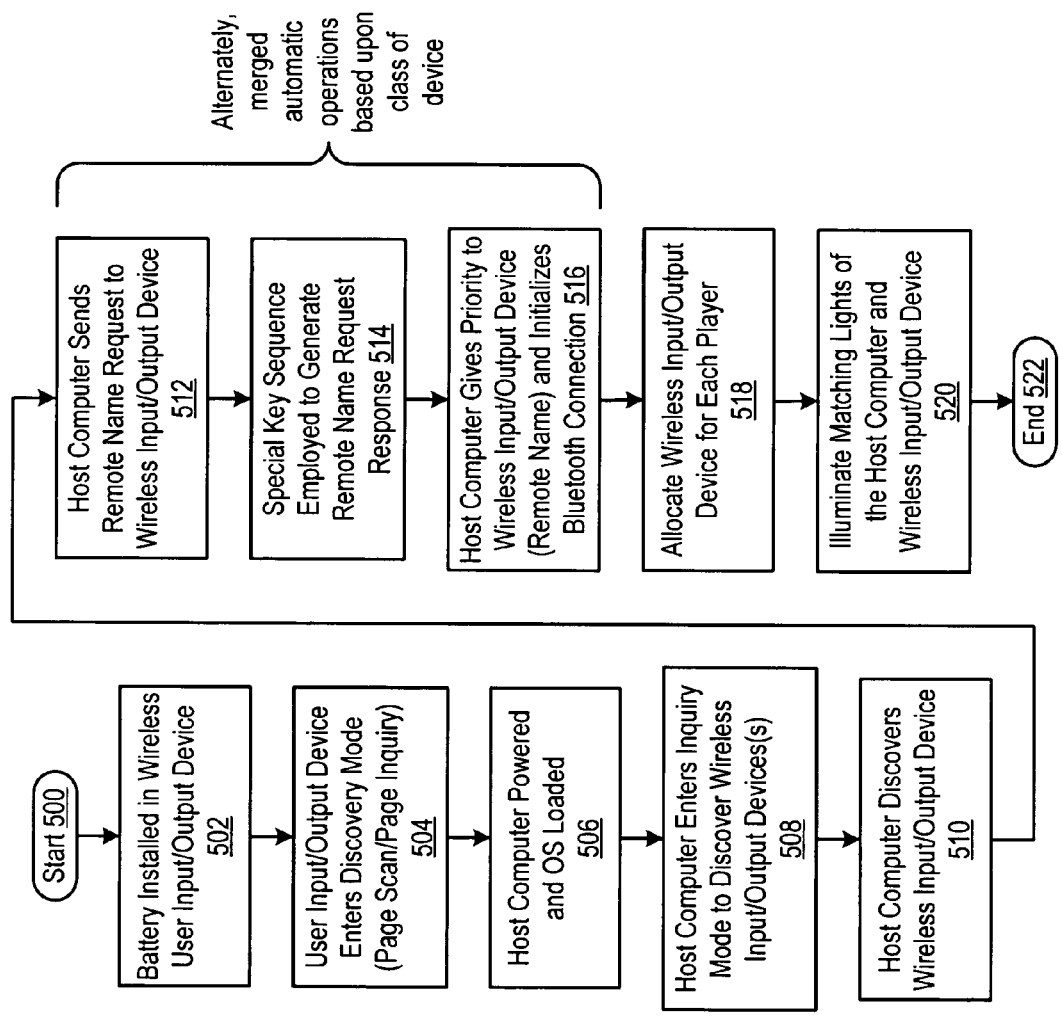
FIG. 5 illustrates an exemplary system and methodology for visually associating a wireless input/output device with a player in a computer game executing on a host computer.

FIG. 5 illustrates an exemplary system and methodology for visually associating a wireless input/output device with a player in a computer game executing on a host computer whereby a wireless user input/output device is set up and paired or bonded with a host computing system so that that a player identity in a game executing on the host computer may be visually associated with an input/output device being serviced by the host computer. At the start 500, the host computer and wireless user input/output device are initially unpaired or unbonded. For example, Bluetooth devices are unpaired when there has been no link key exchanged between the devices. The remaining operations of FIG. 5 cause a pair of unpaired devices to become paired so that a player and controller may be visually associated with one another using indicator lights.

As a first step, the wireless user input/output device (e.g., game controller device) is powered up (step 502), such as by installing the battery. Next, the wireless user input/output device enters a discovery mode (step 504) based on receipt of a configuration input from a user of the wireless user input/output device. For example, the user input/output device enters a discovery mode upon being powered up, or upon execution of a particular operation by the user, such as the pressing of a connect button.

Either before or after the wireless user input/output device is in the discovery mode, the host computer is powered up and the operating system (OS) is loaded (step 506). In connection with the execution of a computer game, the host computer then uses the host-side wireless interface to enter an inquiry mode after determining that the host computer supports Bluetooth (or other) operations and that the host computer has not yet bonded with any wireless input/output device (step 508). For example, this can occur when the computer game is started so that player control input is required. The host-side wireless interface of the host computer then discovers the wireless user input/output device (step 510) and requests identifying information from the wireless user input/output device (step 512), such as by sending a Remote Name Request to the wireless user input/output device. The wireless user input/output device responds to the host-side wireless interface of the host computer with a response (e.g., a Remote Name Request Response) identifying the wireless user input/output device (step 514). In various embodiments, the host-side wireless interface will use the identifying information in the response from the wireless user input/output device to give priority to the wireless user input/output device and/or to initialize a wireless connection (step 516). The identifying information may be, for example, a Class-of-Device field as defined in the Bluetooth standard that identifies the wireless user input/output device as a Human Input Device. In another embodiment, the device may be identified by the contents of a data which is retrievable via the Bluetooth Service Discovery Profile (SDP). One skilled in the art will recognize that a variety of methods may be employed by the host computer to recognize a suitable device to which it should pair.

In an alternate embodiment, steps 512-516 may be merged into a single automatic operation. In such merged operation, the host computer determines that the wireless input/output device is of a particular class of device in discovering the wireless input/output device. Upon identifying that the wireless input/output device is of a particular class of device, the host computer gives priority to the wireless input/output device and initializes the Bluetooth connection with the wireless input/output device.

Once the host computer discovers the wireless input/output device(s) required for each player in the computer game, the host computer allocates or assigns a wireless input/output device for each player (step 518). Based on this allocation, the host computer issues control signals to illuminate matching colored indicators on the host computer and the wireless input/output device so that the color of the indicator on the wireless input/output device matches the color of the player on the host computer (step 520). For example, each wireless input/output device may have a single multi-colored light where the color of the light is selected to correspond to the player color indicated on the host computer, which may be indicated with one or more color indicators on a game console or with a color indicator on the game display screen. Each wireless input/output device may also have a plurality of different-colored light indicators, where the selection of the color on the wireless input/output device to be illuminated depends on the player associated with the wireless input/output device and identified at the host computer with a corresponding color indication. Where a host computer uses colored indicator lights to identify different players, each wireless input/output device may have numbered indicator lights, one of which would light to indicate the player color.

In accordance with the present invention as described herein, it will be understood that the operations of FIG. 5 are not limited to the sequence indicated by the numbering, and it will be appreciated that these various operations could be performed in differing orders or concurrently with one another, or certain steps and elements may be combined or eliminated.

Although the described exemplary embodiments disclosed herein are directed to computer game systems, the present invention is not necessarily limited to the example embodiments which illustrate inventive aspects of the present invention that are applicable to a wide variety of electronic systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for visually associating a wireless game controller with a player in a wireless gaming system, comprising:
    assigning a wireless game controller to a player in a game that executes on a host computing system, in which the wireless game controller and the host computing system have integrated radio frequency wireless transceivers; and
    illuminating a colored indicator light of a particular color on the host computing system and illuminating a corresponding colored indicator light of a same color on the wireless game controller as the particular color of the colored indicator light on the host computing system to indicate by matching colors which player is controlled by the wireless game controller assigned to that player, wherein colored indicator lights of different colors are used to assign different players to respective different game controllers.

2. The method of claim 1, further comprising transmitting a control signal to the wireless game controller over a single wireless interface device for controlling the illuminating of the colored indicator light of the same color on the wireless game controller.

3. The method of claim 1, further comprising transmitting a control signal to the wireless game controller according to at least one version of the Bluetooth wireless standard.

4. The method of claim 1, further comprising transmitting a control signal to the wireless game controller according to at least one version of the Zigbee wireless standard.

5. The method of claim 1, further comprising transmitting a control signal to the wireless game controller according to a proprietary wireless protocol.

6. The method of claim 1, further comprising transmitting a control signal to the wireless game controller according to a wireless communication protocol.

7. The method of claim 1, where the colored indicator light on the wireless game controller is a single multi-colored light indicator in which different colors are lit and a lit color corresponds to the same color as the particular color of the colored indicator light on the host computing system.

8. The method of claim 1, where the colored indicator light on the wireless game controller is one of a plurality of colored indicator lights of different colors.

9. The method of claim 1, where the colored indicator light on the wireless game controller is a light emitting diode.

10. The method of claim 1, where the colored indicator light on the wireless game controller is a lit color of a multi-colored light emitting diode.

11. The method of claim 1, where multiple wireless game controllers are used with the host computing system, in which colored indicator lights of different color are assigned to each game controller.

12. A game controller device for wirelessly communicating with a computer system, comprising:
    a portable housing;
    one or more input keys or analog joysticks for generating one or more control signals for controlling player actions in a video game executing on the computer system;
    an integrated radio frequency transceiver and antenna for wirelessly exchanging control signals with the computer system; and
    a plurality of colored indicator lights of different colors, in which one of the colored indicator lights of a particular color is lit and matches a color on the computer system to indicate by matching colors which corresponding player in a video game is controlled by the game controller device.

13. The game controller device of claim 12, where the plurality of colored indicator lights are constructed from a single multi-colored light emitting device.

14. The game controller device of claim 12, where the plurality of colored indicator lights are constructed from light emitting diodes.

15. The game controller device of claim 12, where the plurality of colored indictor lights are constructed from a multi-colored light emitting diode.

16. A wireless gaming system comprising:
    a computer system for executing a video game; and
    a wireless game controller having a plurality of colored indicator lights, in which one of the colored indicator lights is lit to a particular color to indicate by matching color on the computer system which corresponding player in the video game is controlled by the game controller and wherein colored indicator lights of different colors are used to assign different players to respective different game controllers, the computer system and the wireless game controller each having integrated radio frequency wireless transceivers.

* * * * *